United States Patent
Lee et al.

(10) Patent No.: US 7,486,890 B2
(45) Date of Patent: Feb. 3, 2009

(54) OPTICAL TRANSMISSION APPARATUS AND METHOD

(75) Inventors: Hyun Jae Lee, Daejeon (KR); Kwang Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 501 days.

(21) Appl. No.: 11/289,906

(22) Filed: Nov. 29, 2005

(65) Prior Publication Data

US 2006/0120664 A1 Jun. 8, 2006

(30) Foreign Application Priority Data

Dec. 8, 2004 (KR) .................. 10-2004-0102964
May 20, 2005 (KR) .................. 10-2005-0042423

(51) Int. Cl.
*H04J 14/00* (2006.01)

(52) U.S. Cl. .............................. 398/70; 398/71; 398/73

(58) Field of Classification Search ............. 398/70–79
See application file for complete search history.

(56) References Cited

U.S. PATENT DOCUMENTS

| | | | |
|---|---|---|---|
| 7,236,656 B2 * | 6/2007 | Welch et al. | 385/14 |
| 7,298,974 B2 * | 11/2007 | Tanobe et al. | 398/63 |
| 2001/0004290 A1 * | 6/2001 | Lee et al. | 359/124 |
| 2004/0213574 A1 * | 10/2004 | Han et al. | 398/71 |

FOREIGN PATENT DOCUMENTS

| | | |
|---|---|---|
| KR | 2001-0063072 | 7/2001 |
| KR | 1020010063062 | 7/2001 |
| KR | 1020010063062 A | 7/2001 |
| KR | 1020030037250 A | 5/2003 |
| KR | 1020040029569 A | 4/2004 |
| KR | 1020040044673 A | 5/2004 |

OTHER PUBLICATIONS

IEEE Photonics Technology Letters, vol. 12, No. 8, Aug. 2000, pp. 1067-1069.

* cited by examiner

*Primary Examiner*—Dzung D Tran
(74) *Attorney, Agent, or Firm*—Blakely, Sokoloff, Taylor & Zafman LLP

(57) ABSTRACT

Provided are an optical transmission apparatus and method using a light source for wavelength division multiplexing (WDM) optical communication that employs a Fabry-Perot laser diode (F-P LD) whose output wavelength is locked by an externally injected incoherent light, a multifiber, and a waveguide grating router. The light transmission apparatus includes: an incoherent light source (ILS) outputting incoherent light; a plurality of circulators (CIRs) connected to the ILS, receiving the incoherent light from the ILS, and outputting first optical signals; a first waveguide grating router (WGR) outputting the first optical signals output from each of the CIRs to optical fibers corresponding to each of the CIRs, and outputting second optical signals input from the optical fibers to the corresponding CIRs; a plurality of second WGRs corresponding to each of the CIRs, and demodulating the second optical signals output from each of the plurality of CIRs; and a plurality of receivers connected to the plurality of the second WGRs, and inputting the demultiplexed optical signals output from the plurality of second WGRs. A plurality of light sources for WDM optical communication whose output wavelength is locked can increase size and economical efficiency of a light transmission system (subscriber). The N×N WGR can produce a conventional light transmission system and accommodate many subscribers.

15 Claims, 7 Drawing Sheets

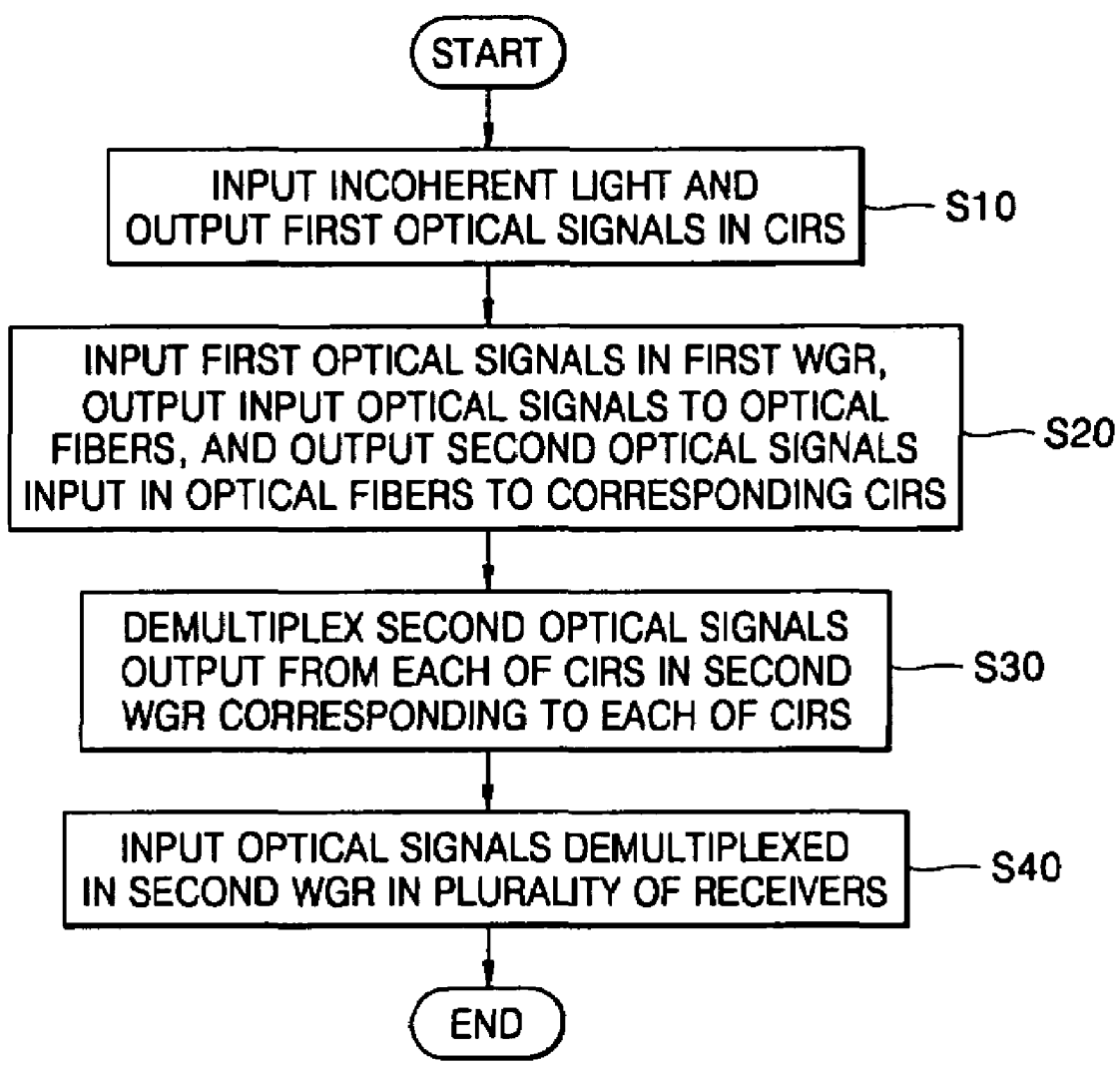

OPTICAL TRANSMISSION APPARATUS AND METHOD

BACKGROUND OF THE INVENTION

This application claims the benefit of Korean Patent Application No. 10-2004-0102964, filed on Dec. 8, 2004, and Korean Patent Application No. 10-2005-0042423, filed on May 20, 2005, in the Korean Intellectual Property Office, the disclosures of which are incorporated herein in their entirety by reference.

1. Field of the Invention

The present invention relates to an optical transmission apparatus and method, and more particularly, to an optical transmission apparatus and method using a light source for wavelength division multiplexing (WDM) optical communication that employs a Fabry-Perot laser diode (F-P LD) whose output wavelength is locked by an externally injected incoherent light, a multifiber, and a waveguide grating router.

2. Description of the Related Art

Wavelength division multiplexing (WDM) optical transmission apparatuses are being introduced to satisfy increasing communication demands. In particular, WDM optical transmission apparatuses are being introduced into metropolitan networks and access networks that provide broadband services such as electronic commerce, cable TV, video conferencing, etc. necessary for a future information society.

FIG. 1 illustrates a conventional WDM optical transmission apparatus. A transmission node of the conventional WDM optical transmission apparatus includes N transmitters $TX_1$-$TX_N$ that output optical signals $\lambda_1$~$\lambda_N$ having different wavelengths, and an N×1 multiplexer MUX that multiplexes output signals of the N transmitters $TX_1$-$TX_N$. A reception node of the conventional WDM optical transmission apparatus includes a 1×N demultiplexer DEMUX that divides received signals into optical signals of different wavelengths, and N receivers $RX_1$-$RX_N$ that regenerate electrical signals from the optical signals. The transmission node and the reception node are connected via an optical fiber. In case where a transmission distance is long, an optical amplifier is used to compensate for loss of the optical fiber.

Since channels for connecting the transmission node and the reception node of the conventional WDM optical transmission apparatus are divided by wavelengths of the optical signals, a light source used for the transmission node needs a stable output wavelength, and interference between adjacent channels needs to be minimized. The conventional WDM optical transmission apparatus needs high output power to guarantee a sufficient optical signal to noise ratio, and a narrow line width to minimize effect of chromatic dispersion. A distributed feedback laser diode (DFB LD) is a light source that meets such requirements. However, since the DFB LD is expensive, incoherent lights are usually used in the access network that requries an economical light source.

Since incoherent lights using a light emitting diode (LED), a super luminescent diode (SLD), and a natural emitting light of the optical amplifier have wide spectrums, it is difficult to use a WDM light source as it is, and a spectrum slicing method is used. However, the LED does not have sufficient output power to provide a plurality of channels using the spectrum slicing method, and while the SLD has relatively high output power it is expensive. The light source of the optical amplifier has high output power but needs an external modulator.

A light source for the WDM optical communication using a Fabry-Perot laser diode (F-P LD) whose output wavelength is locked by an externally injected incoherent light is an economical light source. Although it is economical, a plurality of users uses a plurality of light sources, i.e., different wavelengths.

SUMMARY OF THE INVENTION

The present invention provides an optical transmission apparatus using a light source for wavelength division multiplexing (WDM) optical communication that employs a Fabry-Perot laser diode (F-P LD) whose output wavelength is locked by an externally injected incoherent light, a multifiber, and a waveguide grating router.

The present invention also provides method using a light source for WDM optical communication that employs a Fabry-Perot laser diode (F-P LD) whose output wavelength is locked by an externally injected incoherent light, a multifiber, and a waveguide grating router.

According to an aspect of the present invention, there is provided a light transmission apparatus, comprising: an incoherent light source (ILS) outputting incoherent light; a plurality of circulators (CIRS) connected to the ILS, receiving the incoherent light from the ILS, and outputting first optical signals; a first waveguide grating router (WGR) outputting the first optical signals output from each of the CIRs to optical fibers corresponding to each of the CIRs, and outputting second optical signals input from the optical fibers to the corresponding CIRs; a plurality of second WGRs corresponding to each of the CIRs, and demodulating the second optical signals output from each of the plurality of CIRs; and a plurality of receivers connected to the plurality of the second WGRs, and inputting the demultiplexed optical signals output from the plurality of second WGRs.

The light transmission apparatus may further comprise: a plurality of third WGRs corresponding to the optical fibers, and spectrum-splicing the incoherent light input from the first WGR via the optical fibers; and a plurality of transmitters including a Fabry-Perot laser diode (F-P LD) connected to an output node of the plurality of the third WGRs via the optical fibers, wherein each of the transmitters transfers optical signals having different wavelengths which are locked by the incoherent light that is spectrum-spliced and injected into the plurality of the third WGRs, and the plurality of the third WGRs multiplex the optical signals transferred from each of the transmitters and transmit the multiplexed optical signals to the first WGR via the optical fibers.

The light transmission apparatus may further comprise: a plurality of bi-directional optical amplifiers corresponding to the optical fibers, interposed between the first WGR and the optical fibers, and amplifying the optical signals.

According to another aspect of the present invention, there is provided a light transmission apparatus, comprising: an ILS outputting incoherent light; a first WGR connected to the ILS, inputting the incoherent light from the ILS, and outputting first optical signals; a plurality of circulators CIRs transferring the first optical signals output from the first WGR to corresponding optical fibers, and corresponding to each of the optical fibers that output second optical signals input from the optical fibers; a plurality of second WGRs corresponding to each of the plurality of CIRs, and demodulating the second optical signals output from each of the plurality of the CIRs; and a plurality of receivers connected to the plurality of the second WGRs, and receiving the demultiplexed optical signals output from the second WGRs.

The light transmission apparatus may further comprise: a plurality of third WGRs corresponding to the optical fibers, and spectrum-splicing the incoherent light input from the plurality of the CIRs via the optical fibers; and a plurality of transmitters including an F-P LD connected to nodes of the third WGRs via the optical fibers, wherein each of the plurality of the transmitters transfers optical signals having different wavelengths which are locked by the incoherent light that is spectrum-spliced and injected into the plurality of the third WGRs, and the plurality of the third WGRs multiplex the optical signals transferred from each of the transmitters and transmit the multiplexed optical signals to the plurality of the CIRs via the optical fibers.

The light transmission apparatus may further comprise: a plurality of optical amplifiers corresponding to the CIRs, interposed between the first WGR and the CIRs, amplifying the optical signals output from the first WGR, and outputting the amplified optical signals to the plurality of the CIRs.

According to still another aspect of the present invention, there is provided a light transmission method for transferring an upstream signal of a passive optical network (PON), the light transmission method comprising: inputting incoherent light output from the ILS, and outputting first optical signals in a plurality of CIRs; inputting the first optical signals in the first WGR, outputting the input optical signals to optical fibers corresponding to each of the CIRs, and outputting second optical signals input in the optical fibers to the corresponding plurality of the CIRs; demultiplexing the second optical signals output from each of the CIRs in the second WGR corresponding to each of the CIRs; and inputting the optical signals demultiplexed in the second WGR to a plurality of receivers connected to the second WGR.

The light transmission method may further comprise: spectrum-splicing the incoherent light input from the first WGR via the optical fibers in the plurality of third WGRs corresponding to the optical fibers; transferring the optical signals having different wavelengths which are locked by the incoherent light that is spectrum-spliced and injected into the third WGRs in each of a plurality of transmitters including F-P LDs connected to nodes of the third WGRs via the optical fibers; and multiplexing the optical signals transmitted from each of the transmitters and transmitting the multiplexed optical signals to the first WGR via the optical fibers in each of the third WGRs.

The light transmission method may further comprise: amplifying the optical signals transferred from the first WGR to the optical fibers.

BRIEF DESCRIPTION OF THE DRAWINGS

The above objects and advantages of the present invention will become more apparent by describing in detail exemplary embodiments thereof with reference to the attached drawings in which:

FIG. 8 illustrates a light transmission method according to an embodiment of the present invention.

DETAILED DESCRIPTION OF THE INVENTION

The present invention will now be described more fully with reference to the accompanying drawings, in which exemplary embodiments of the invention are shown.

Figure 1:
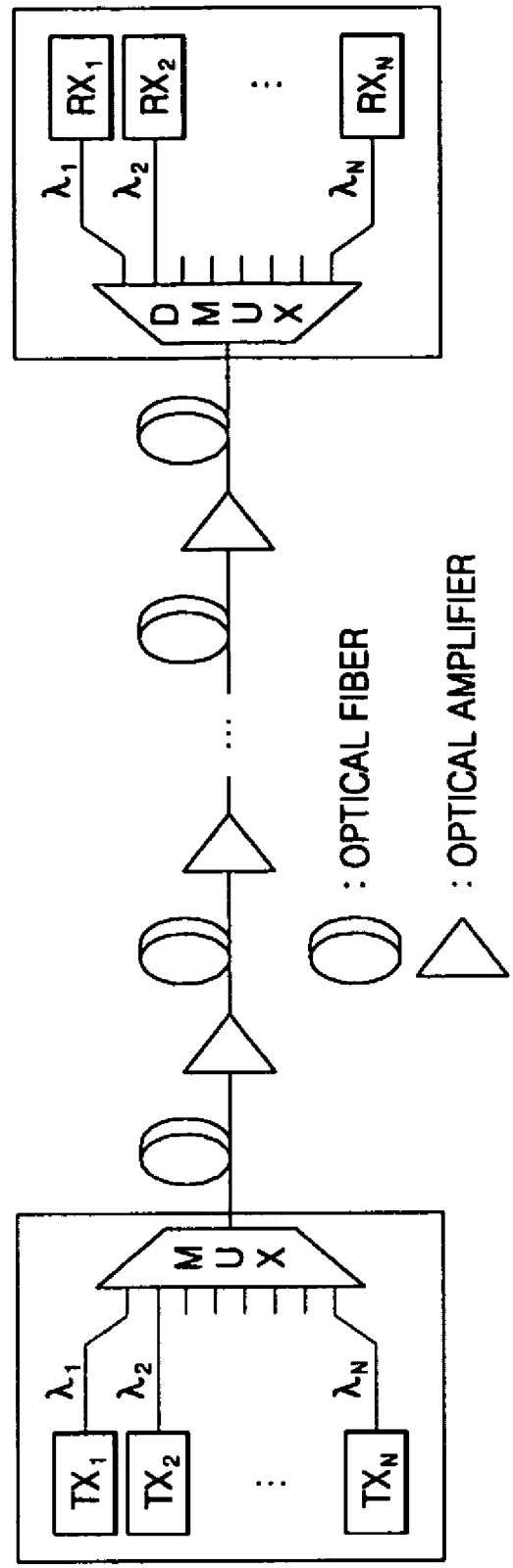
FIG. 1 illustrates a conventional wavelength division multiplexing (WDM) optical transmission apparatus.
Figure 2:
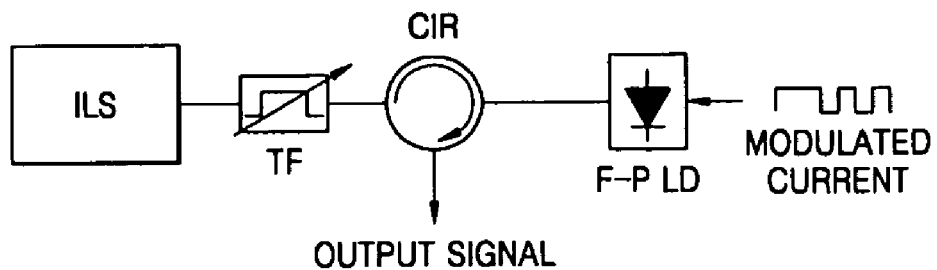
FIG. 2 illustrates a constitution of a light source using a Fabry-Perot laser diode (F-P LD) whose output wavelength is locked by an externally injected incoherent light.

FIG. 2 illustrates a constitution of a light source using a Fabry-Perot laser diode (F-P LD) whose output wavelength is locked by an externally injected incoherent light. The light source includes an incoherent light source (ILS), a tunable filter (TF) that passes a component of a desired wavelength band among output lights of the ILS and tunes a pass band, the F-P LD, and a circulator (CIR) that transfers an output of the TF to the F-P LD and outputs light input from the F-P LD.

The ILS uses an optical fiber amplifier that outputs a natural emitting light, a light emitting diode (LED), and a super luminescent diode (SLD). An isolator is removed from the F-P LD so as to inject a light from outside.

An operation of the light source will now be described.

A component of a filter pass band among output lights of the ILS is injected into the F-P LD through the CIR. The F-P LD to which current above a threshold current is applied outputs a plurality of modes. However, if light having a narrow band is externally injected into the F-P LD, the F-P LD suppresses oscillating modes whose wavelength is different from that of the externally injected light, and outputs oscillating modes whose wavelength is identical to that of the externally injected light. Therefore, the F-P LD outputs a spectrum similar to that of a single mode laser through the CIR connected thereto. Since an output wavelength of the light source is identical to that of the ILS, a central wavelength of the pass band of the TF is controlled.

A change in the current applied to the F-P LD results in a change in optical power output in the CIR. To be more specific, if a bias current is properly applied to the F-P LD in which the ILS is injected, the F-P LD outputs a polarized light. If the applied bias current is lower than the threshold current, the F-P LD outputs no light, whereas, some components of injected incoherent light are reflectively output. Such a characteristic is used to obtain an optical signal by varying the bias current applied to the F-P LD.

The CIR is used in the present embodiment in order to minimize both loss of the ILS injected from the light source and an optical signal output from the F-P LD. However, if the CIR is replaced with an inexpensive optical power coupler, a light source having a similar characteristic can be obtained.

The light source for WDM optical communication that outputs N multiplexed optical signals can be realized using the operation described in the embodiment.

Figure 3:
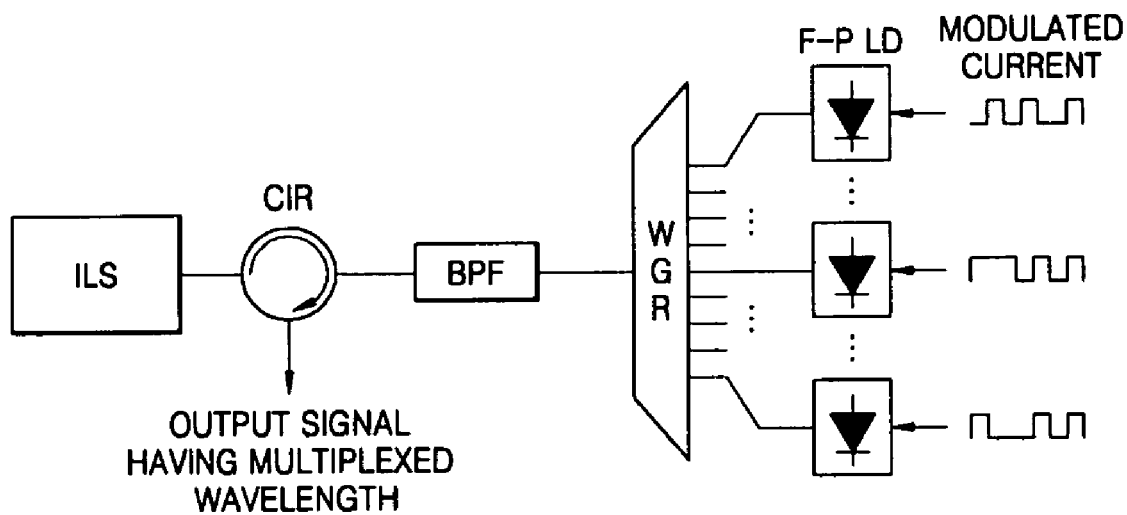
FIG. 3 illustrates a light source that outputs N multiplexed optical signals having different wavelengths.

FIG. 3 illustrates a light source that outputs N multiplexed optical signals having different wavelengths. Referring to FIG. 3, the light source includes an ILS, a CIR, a band pass filer (BPF), a 1×N waveguide grating router (WGR), and N F-P LDs.

The CIR connects an output of the ILS to the BPF, and outputs an optical signal input from the BPF. The BPF is connected to the CIR and restricts a spectrum of the ILS to a free spectral range (FSR) of the 1×N WGR.

The 1×N WGR spectrum-splices an:output of the BPF and multiplexes outputs of the N F-P LDs. The N F-P LDs are connected to each of output nodes of the 1×N WGR, and outputs a signal component having the same wavelength as that of a pass band of the 1×N WGR.

The ILS uses an optical fiber amplifier that outputs a natural emitting light, an LED, and an SLD. An isolator is removed from the N F-P LDs so as to inject a light from outside.

If the spectrum of the ILS input into the 1×N WGR is wider than the FSR, the BPF restricts a bandwidth of the ILS to the FSR of the 1×N WGR so that each of the output nodes of the 1×N WGR can output an optical component having a wavelength. Therefore, if the bandwidth of the ILS is restricted to the FSR of the 1×N WGR, it is not necessary to use the BPF.

The operation of the light source that outputs a WDM optical signal will now be described.

An output of the ILS having a wide spectrum is input to the 1×N WGR through the CIR, and spectrum-spliced according to each of the output nodes of the 1×N WGR. Therefore, the ILS with a narrow band having a different central wavelength is input to the N F-P LDs connected to each of the output nodes of the 1×N WGR.

After the ILS is injected, the N F-P LDs output optical signals having the same wavelength as that of the injected ILS, i.e., the same wavelength as the central wavelength of the pass band of the 1×N WGR. An output of each of the N F-P LDs is multiplexed in the 1×N WGR and output through the CIR.

Since the output of each of the N F-P LDs can control the pass band of the 1×N WGR, output wavelengths of N light sources with a predetermined channel interval can be controlled by adjusting a temperature of the 1×N WGR.

Since a direct modulation of a current applied to each of the N F-P LDs enables the outputs of the N F-P LDs to be independently controlled, modulated optical signals having different wavelengths can be generated.

A transmission node of the WDM light transmission apparatus needs at least one WGR in order to multiplex a signal. Since the one WGR is used to spectrum-splice the injected ILS and multiplex an output signal, the WDM light transmission apparatus does not need a spare router. Since the WDM light transmission apparatus can generate a plurality of optical signals using an ILS and a CIR, it is economical.

The application of the light source will now be described below. The light source has a variety of structures according to an application field. For example, the ILS, the router, and the F-P LD are spatially separated from each other in a situation where the light source is applied to a passive optical network (PON).

Figure 4A:
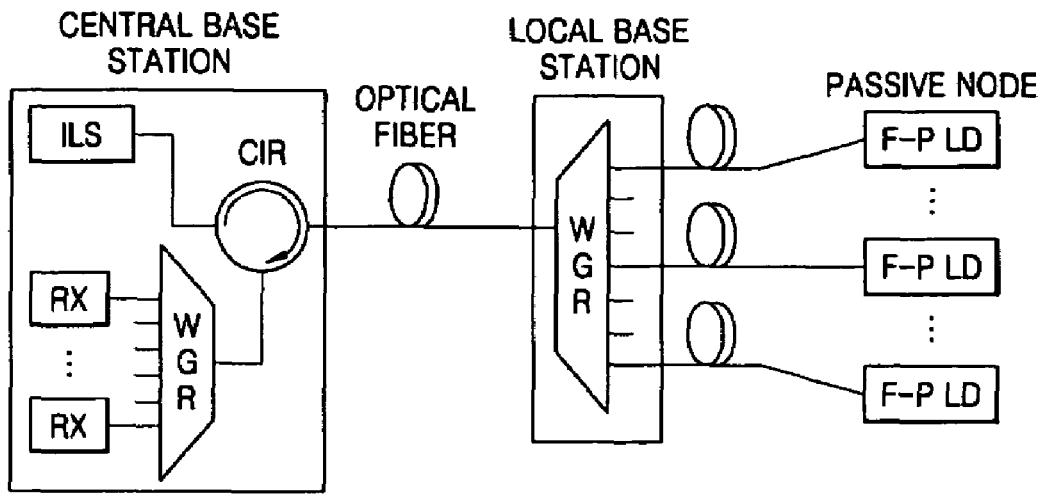
FIGS. 4A and 4B illustrate the structure of an upstream signal transmission apparatus in a passive optical network (PON)

FIG. 4A illustrates a structure of an upstream signal transmission apparatus using the light source in the PON according to an embodiment of the present invention. Referring to FIG. 4A, an ILS, a WGR, and F-P LDs are installed in a central base station, a local base station, are a passive nodes, which are spatially separated from each other, respectively. FIG. 4A illustrates the PON comprising the central base station, the local base station, and passive nodes, which are connected therebetween via optical fibers.

The central base station includes the ILS, a CIR that transfers an output of the ILS to the optical fiber connected to the local base station and outputs light signal input from the optical fiber connected to the local base station, a WGR that demultiplexes an output of the CIR, and a plurality of receivers Rexes.

The local base station includes a 1×N WGR having a pass band without period that spectrum-splices the ILS transferred from the central base station and that multiplexes optical signals transferred from each of the passive nodes.

The passive nodes include F-P LDs connected to nodes of the 1×N WGR of the local base station via the optical fiber.

Each of the passive nodes transfers an optical signal having different wavelengths which is locked by the ILS that is spectrum-spliced and injected in the local base station to the central base station.

The application of the light source results in an output wavelength of each of the F-P LDs to correspond to the pass band of the WGR without any wavelength control.

When the light source is applied to the PON, if a lot of loss occurs between the central base station and the passive nodes, a rayleigh back-scattering component of the ILS is added to a signal received by the central base station, which may deteriorate the signal.

Figure 4B:
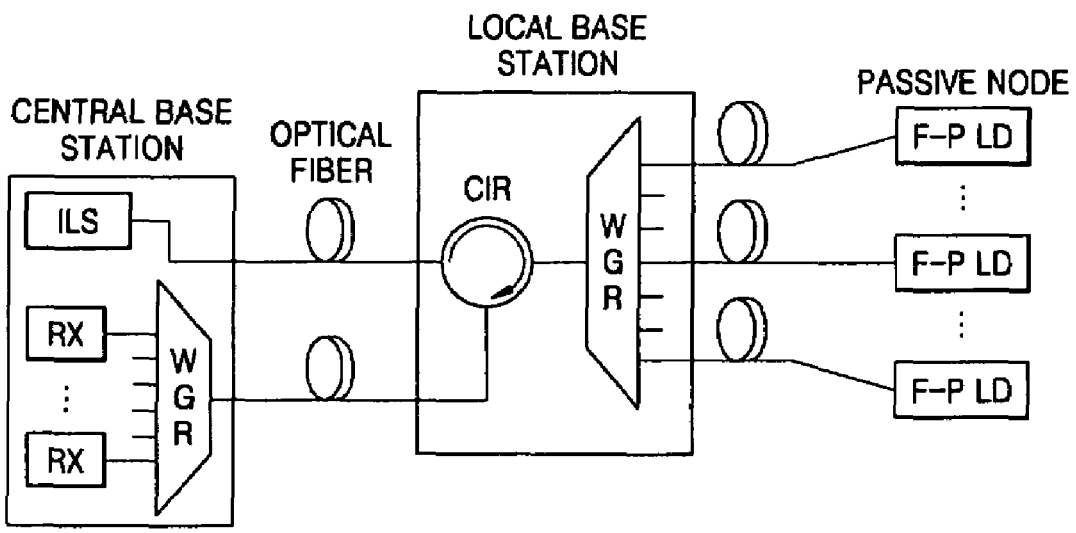

To prevent such a deterioration of the signal, the light source has a structure illustrated in FIG. 4B.

FIG. 4B illustrates a structure of an upstream signal transmission apparatus using the light source in the PON according to another embodiment of the present invention. Referring to FIG. 4B, the CIR is installed in the local base station to divide anoptical fiber transferred from the injected incoherent light and an optical fiber by a signal transferred from the passive nodes to the central base station, thereby reducing the deterioration of the signal due to the rayleigh back-scattering.

FIG. 4B illustrates the PON comprising the central base station, the local base station, and the plurality of passive nodes, which are connected therebetween via optical fibers.

The central base station includes the ILS, a WGR that demultiplexes an optical signal input from the local base station, and a plurality of receivers Rexes.

The local base station includes a CIR that is combined with the optical fiber connected to the central base station, connects an output of the ILS to a 1×N WGR, and outputs an optical signal input from the 1×N WGR. The 1×N WGR spectrum-splices the incoherent light output from the CIR, multiplexes optical signals transferred from each of the passive nodes, and transfers the multiplexed optical signals to the CIR.

The passive nodes includes F-P LDs connected to nodes of the 1×N WGR of the local base station via optical fibers. Each of the passive nodes transfers optical signals having different wavelengths which are locked by the incoherent light that is spectrum-spliced and injected in the local base station to the central base station.

Figure 5:
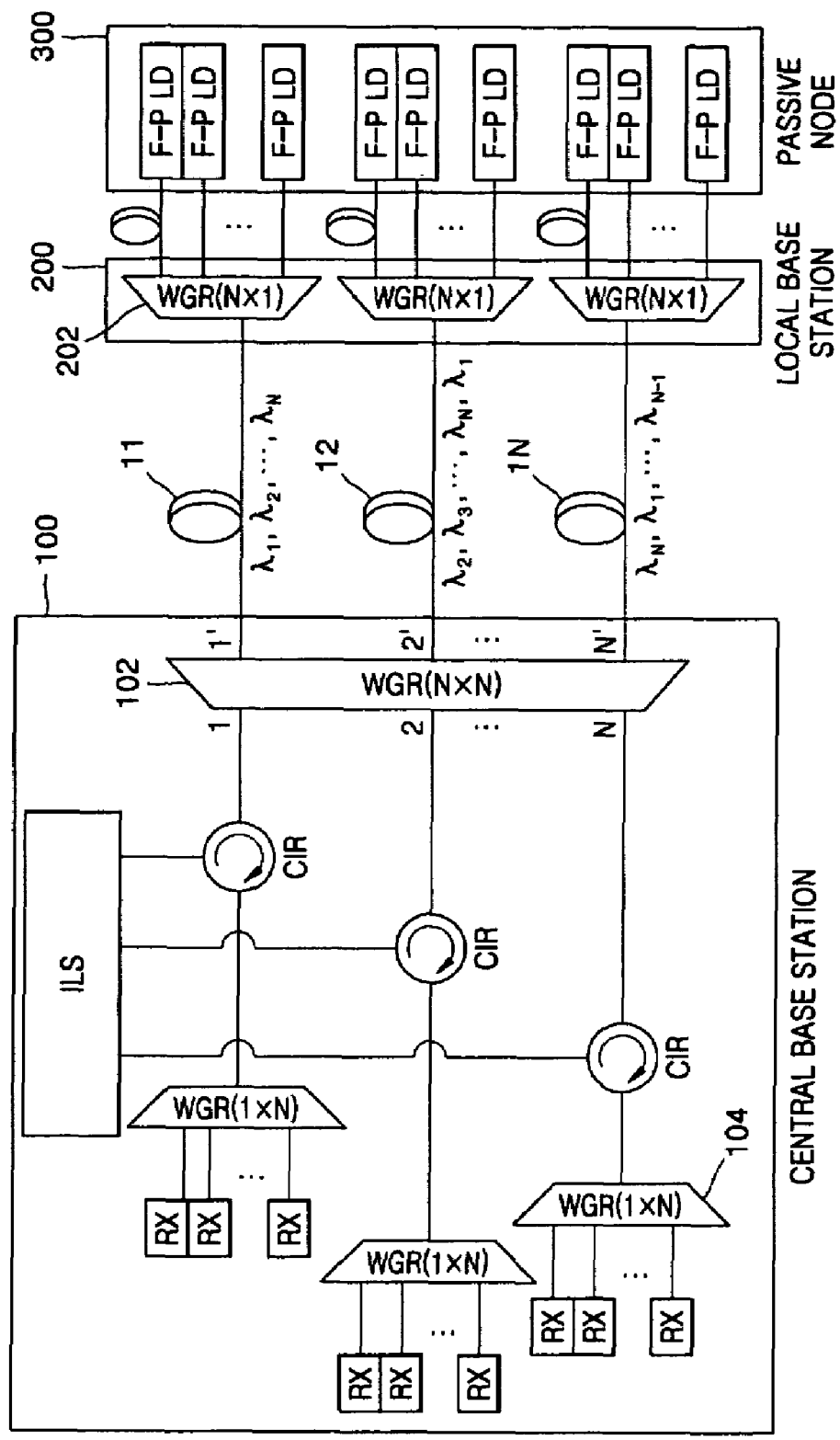
FIG. 5 illustrates a light transmission apparatus according to an embodiment of the present invention.

FIG. 5 illustrates a light transmission apparatus according to an embodiment of the present invention. The light transmission apparatus transfers an upstream signal of the PON comprising a central base station 100, a local base station 200, and passive nodes 300, which are connected therebetween via optical fibers.

The central base station 100 includes an ILS, a plurality of CIRs, a first N×N WGR 102, a plurality of second 1×N WGRs 104, and a plurality of Rexes.

The CIRs are connected to the ILS, input incoherent light from the ILS, and output first optical signals.

The first N×N WGR 102 outputs the first optical signals output from each of the CIRs to optical fibers 11, 12, ... 1N corresponding to each of the CIRs connected to the local base station 200, and outputs second optical signals input from the optical fibers 11, 12, ... 1N connected to the local base station 200.

The plurality of second 1×N WGRs 104 corresponding to each of the CIRs demultiplex the second optical signals output from each of the CIRs, and output the demultiplexed signals to the plurality of RXs.

The local base station 200 includes a plurality of third N×1 WGRs 202 corresponding to the optical fibers 11, 12, ... 1N that spectrum-splice the incoherent light input through the optical fibers 11, 12, . . . 1N from the first N×N WGR 102 of the central base station 100.

The passive nodes 300 include F-P LDs connected to nodes of the plurality of third N×1 WGRs 202 of the local base station 200 via optical fibers. Each of the passive nodes 300 transfers optical signals having different wavelengths which are locked by the incoherent light that is spectrum-spliced and injected in the plurality of the third N×1 WGRs 202 of the local base station 200 to the central base station 100 via the local base station 200.

The plurality of the third N×1 WGRs 202 multiplex the optical signals transferred from the passive nodes 300 and transfer the multiplexed optical signals to the first N×N WGR 102 of the central base station 100 via the optical fibers 11, 12, . . . 1N.

The first N×N WGR 102 may have an N×N arrangement, and the plurality of the second 1×N WGRs 104 may have 1×N arrangements, and the plurality of third N×1 WGRs 202 may have an N×1 arrangement.

The quantity of each of the second 1×N WGRs 104, the third N×1 WGRs 202, and the CIRs is N.

Referring to FIG. 5, the first N×N WGR 102 divides the optical signals output from the CIRs into optical signals having a plurality of wavelengths, and transfers the divided optical signals to the optical fibers 11, 12, . . . 1N connected to the local base station 200.

For example, the first N×N WGR 102 outputs a first optical fiber 11 to N optical signals having a first wavelength $\lambda_1$, a second wavelength $\lambda_2$, a third wavelength $\lambda_3$, . . . , and an $N^{th}$ wavelength $\lambda_n$, and outputs a second optical fiber 12 to N optical signals having the second wavelength $\lambda_2$, the third wavelength $\lambda_3$, . . . , the $N^{th}$ wavelength $\lambda_n$, and the first wavelength $\lambda_1$, and outputs third optical fiber through an $N^{th}$ optical fiber 1N to N optical signals having the first wavelength $\lambda_1$ through the $N^{th}$ wavelength $\lambda_n$ from the third wavelength $\lambda_3$ through the $N^{th}$ wavelength $\lambda_n$.

Figure 6:
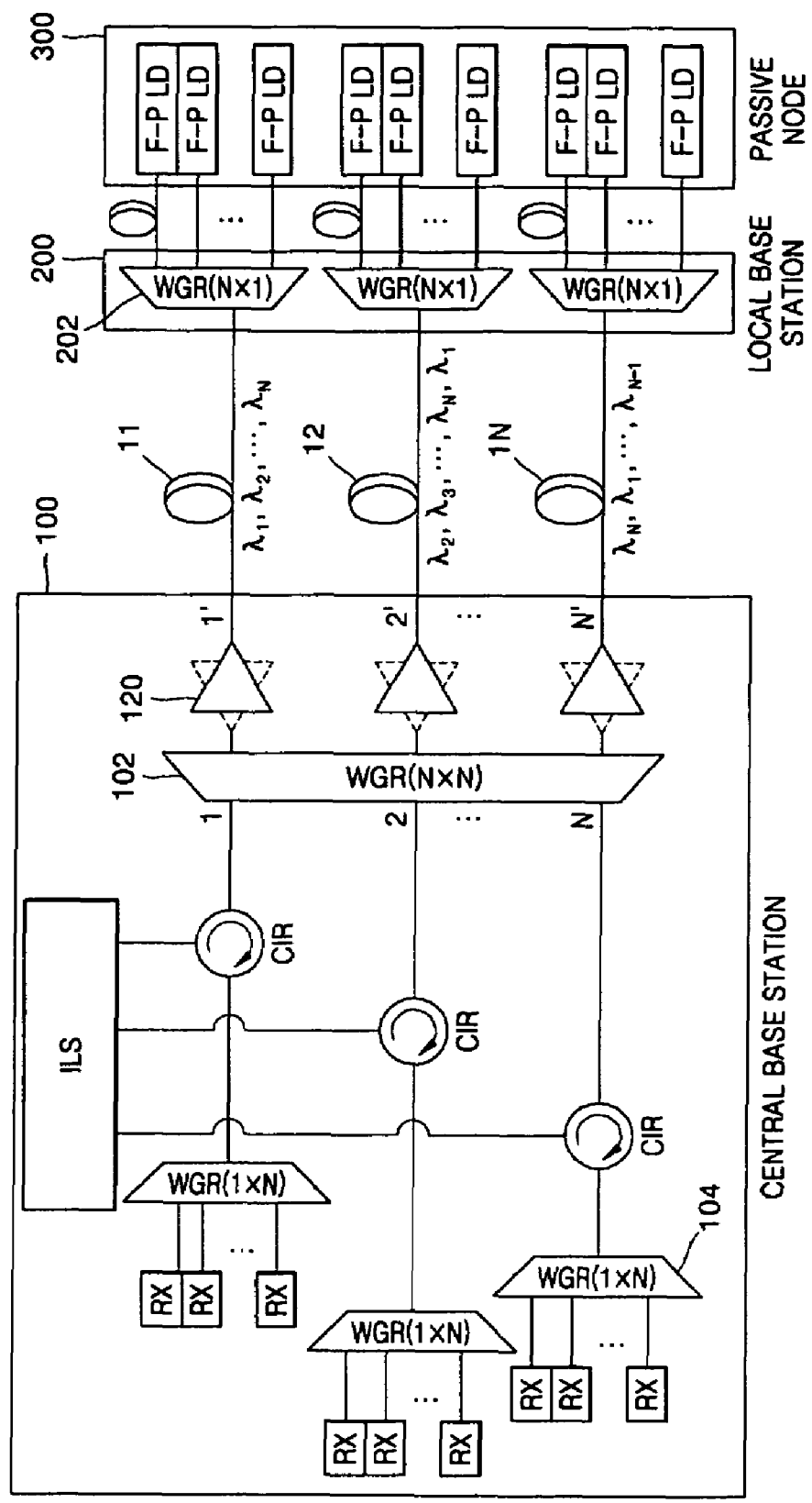
FIG. 6 illustrates a light transmission apparatus according to another embodiment of the present invention.

FIG. 6 illustrates a light transmission apparatus according to another embodiment of the present invention. Referring to FIG. 6, a central base station 100 further includes a plurality of bidirectional optical amplifiers 120. The plurality of the bidirectional optical amplifiers 120 are interposed between optical fibers 11, 12, . . . 1N connected to a first N×N WGR 102 and a local base station 200 and amplify optical signals.

Figure 7:
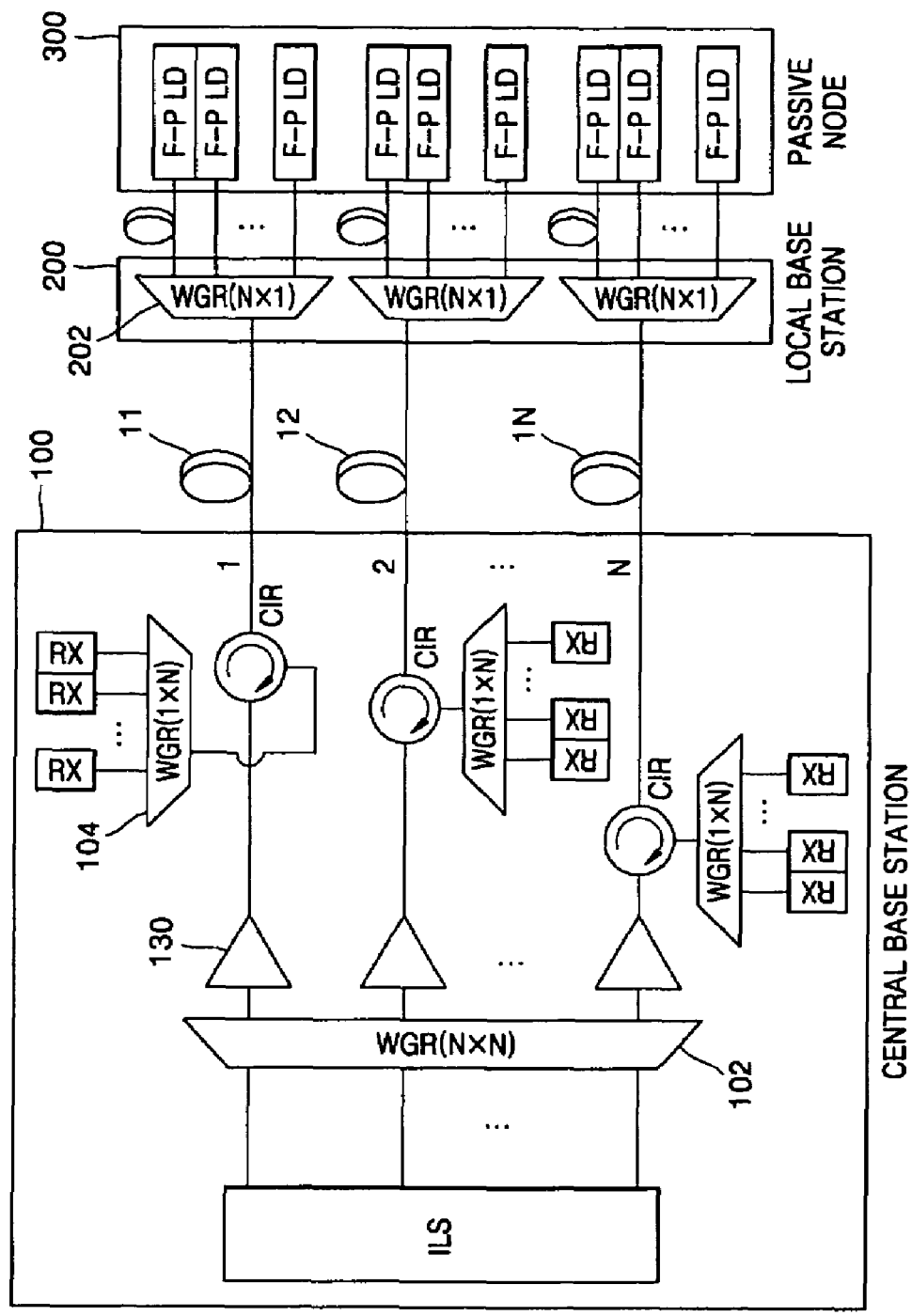
FIG. 7 illustrates a light transmission apparatus according to still another embodiment of the present invention.

FIG. 7 illustrates a light transmission apparatus according to still another embodiment of the present invention. Referring to FIG. 7, the light transmission apparatus transfers an upstream signal of a PON comprising a central base station 100, a local base station 200, and a plurality of passive nodes 300, which are connected therebetween via optical fibers.

The central base station 100 includes an ILS, a plurality of CIRs, a first N×N WGR 102, a plurality of second 1×N WGRs 104, and a plurality of receivers Rexes.

The first N×N WGR 102 connected to the ILS inputs incoherent light from the ILS and outputs first optical signals.

The plurality of the CIRs transfer the first optical signals output from the first N×N WGR 102 to optical fibers 11, 12, . . . 1N corresponding to each of the CIRs connected to the local base station 200, and output second optical signals input from the optical fibers 11, 12, . . . 1N connected to the local base station 200.

The plurality of the second 1×N WGRs 104 corresponding to each of the CIRs, demultiplex the second optical signals output from each of the CIRs and output the demultiplexed optical signals to the plurality of the receivers Rexes.

The local base station 200 includes a plurality of third N×1 WGRs 202 corresponding to the optical fibers 11, 12, . . . 1N that spectrum-splice incoherent light input through the optical fibers 11, 12, . . . 1N from the CIRs of the central base station 100.

The plurality of the passive nodes 300 include F-P LDs connected to nodes of the plurality of the third N×1 WGRs 202 of the local base station 200 via optical fibers. Each of the passive nodes 300 transfers optical signals having different wavelengths which are locked by the incoherent light that is spectrum-spliced and injected in the plurality of the third N×1 WGRs 202 of the local base station 200 to the central base station 100 via the plurality of the third N×1 WGRs 202.

The plurality of the third N×1 WGRs 202 multiplex the optical signals transferred from the passive nodes 300 and transfer the multiplexed optical signals to the CIRs via the optical fibers 11, 12, . . . 1N.

The central base station 100 further includes a plurality of optical amplifiers 130. The plurality of the optical amplifiers 130 are interposed between the first N×N WGR 102 and the CIRs, amplify optical signals output from the first N×N WGR 102, and output the amplified optical signals to the CIRs.

The first N×N WGR 102 may have an N×N arrangement, the plurality of the second 1×N WGRs 104 may have 1×N arrangements, and the plurality of the third N×1 WGRs 202 may have N×1 arrangements.

The quantity of each of the second 1×N WGRs 104, the third N×1 WGRs 202, and the CIRs is N.

FIG. 8 illustrates a light transmission method according to an embodiment of the present invention. The light transmission method transfers an upstream signal of a PON comprising a central base station 100, a local base station 200, and a passive nodes 300, which are connected therebetween via optical fibers.

Incoherent light output from the ILS is input to a plurality of CIRs and first optical signals are output (Operation S10). The first optical signals are output via a first WGR 102 to optical fibers 11, 12, . . . , 1N corresponding to each of the CIRs, and second optical signals input via optical fibers 11, 12, . . . , 1N are output to each of the CIRs (Operation S20).

The second optical signals output from each of the CIRs are demultiplexed in a second WGR 104 corresponding to each of the CIRs (Operation S30). A plurality of receiver RX connected to the second WGR 104 receive the optical signals demultiplexed in the second WGR 104 (Operation S40).

A plurality of third WGRs 202 corresponding to the optical fibers 11, 12, . . . , 1N spectrum-splice the incoherent light input from the first WGR 102 via the optical fibers 11, 12, . . . , 1N. A plurality of passive nodes 300 comprising F-P LDs connected to output node of the third WGR 202 via the optical fiber transfer optical signals having different wavelengths which are locked by the incoherent light that is spectrum-spliced and injected in the third WGR 202 to the third WGR 202. The third WGR 202 multiplexes the optical signals transferred from each of the passive nodes 300 and transmits the multiplexed optical signals to the first WGR 102 via the optical fibers 11, 12, . . . , 1N.

The optical signals transmitted to the first WGR 102 through the optical fibers 11, 12, . . . , 1N may be amplified.

The first WGR 102 outputs N optical signals having a first wavelength $\lambda_1$ through an $N^{th}$ wavelength $\lambda_n$ from the first wavelength $\lambda_1$ in the first optical fiber 11, outputs N optical signals having the first wavelength $\lambda_1$ through the $N^{th}$ wavelength $\lambda_n$ from a second wavelength $\lambda_2$ in the second optical fiber 12, outputs N optical signals having the first wavelength $\lambda_1$ through the $N^{th}$ wavelength $\lambda_n$ from the third wavelength $\lambda_3$ through the $N^{th}$ wavelength $\lambda_n$ in the third optical fiber through an $N^{th}$ optical fiber 1N.

The present invention provides a method of constituting a new optical network including a transmission device including the F-P LD, the multiplexer 202, the WGR 102, the optical fibers 11, 12, . . . 1N, the optical amplifier 130, the bi-directional optical amplifier 120, the demultiplexer 104, the receiver RX, the ILS, the CIR, etc.

If the incoherent light injected from the light transmission system is incident to a multifiber to transmit the first WGR 102, N optical signals having the first wavelength $\lambda_1$ through the $N^{th}$ wavelength $\lambda_n$ are output in the first optical fiber 11, N optical signals having the second wavelength $\lambda_2$ through the $N^{th}$ wavelength $\lambda_n$ and the first wavelength $\lambda_1$ are output in the second optical fiber 12, and N optical signals having the $N^{th}$ wavelength $\lambda_n$, the first wavelength $\lambda_1$, the second wavelength $\lambda_2$, . . . , an N-$1^{th}$ wavelength $\lambda_{n-1}$, and the first wavelength $\lambda_1$ are output in the $N^{th}$ optical fiber 1N according to the light transmission characteristic of the first WGR 102. A method of constituting the light source for WDM optical communication whose output wavelength is locked by dividing the optical signals of the optical fibers 11, 12, . . . 1N into wavelengths using the third WGR 202 and making the divided optical signals to the F-P LD incident is provided.

The WDM light transmission apparatus using the above method and the PON are provided.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

As described above, a plurality of light sources for WDM optical communication whose output wavelength is locked can increase extension and economical efficiency of a light transmission system (subscriber).

An N×N WGR can produce a conventional light transmission system and accommodate many subscribers.

A WDM-PON system using inexpensive WDM light sources can be produced at a small expense.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light transmission apparatus, comprising:
an incoherent light source (ILS) outputting incoherent light;
a plurality of circulators (CIRs) connected to the ILS, receiving the incoherent light from the ILS, and outputting first optical signals;
a first waveguide grating router (WGR) outputting the first optical signals output from each of the CIRs to optical fibers corresponding to each of the CIRs, and outputting second optical signals input from the optical fibers to the corresponding CIRs;
a plurality of second WGRs corresponding to each of the CIRs, and demultiplexing the second optical signals output from each of the plurality of CIRs; and
a plurality of receivers connected to the plurality of second WGRs, and inputting the demultiplexed optical signals output from the plurality of second WGRs.

2. The light transmission apparatus of claim 1, further comprising:
a plurality of third WGRs corresponding to the optical fibers, and spectrum-splicing the incoherent light input from the first WGR via the optical fibers; and
a plurality of transmitters including a Fabry-Perot laser diode (F-P LD) connected to an output node of the plurality of the third WGRs via the optical fibers,
wherein each of the transmitters transfers optical signals having different wavelengths which are locked by the incoherent light that is spectrum-spliced and injected into the plurality of the third WGRs, and
the plurality of the third WGRs multiplex the optical signals transferred from each of the transmitters and transmit the multiplexed optical signals to the first WGR via the optical fibers.

3. The light transmission apparatus of claim 2, wherein the first WGR has an NxN arrangement, and the plurality of third WGRs has an N×1 arrangement, and the quantity of each of the second WGRs, the plurality of the third WGRs, and the plurality of the CIRs is N.

4. The light transmission apparatus of claim 2, wherein the first WGR outputs N optical signals having a first wavelength through an $N^{th}$ wavelength from the first wavelength in a first optical fiber, and outputs N optical signals having the first wavelength through the $N^{th}$ wavelength from a second wavelength in the second optical fiber, outputs N optical signals having the first wavelength through the $N^{th}$ wavelength from a third wavelength through the $N^{th}$ wavelength in the third optical fiber through an $N^{th}$ optical fiber.

5. The light transmission apparatus of claim 1, further comprising: a plurality of bidirectional optical amplifiers corresponding to the optical fibers, interposed between the first WGR and the optical fibers, and amplifying the optical signals.

6. A light transmission apparatus, comprising:
an ILS outputting incoherent light;
a first WGR connected to the ILS, inputting the incoherent light from the ILS, and outputting first optical signals;
a plurality of circulators CIRs transferring the first optical signals output from the first WGR to corresponding optical fibers, and corresponding to each of the optical fibers that output second optical signals input from the optical fibers;
a plurality of second WGRs corresponding to each of the plurality of CIRs, and demultiplexing the second optical signals output from each of the plurality of the CIRs; and
a plurality of receivers connected to the plurality of the second WGRs, and receiving the demultiplexed optical signals output from the second WGRs.

7. The light transmission apparatus of claim 6, further comprising:
a plurality of third WGRs corresponding to the optical fibers, and spectrum-splicing the incoherent light input from the plurality of the CIRs via the optical fibers; and
a plurality of transmitters including an F-P LD connected to nodes of the third WGRs via the optical fibers,
wherein each of the plurality of the transmitters transfers optical signals having different wavelengths which are locked by the incoherent light that is spectrum-spliced and injected into the plurality of the third WGRs, and
the plurality of the third WGRs multiplex the optical signals transferred from each of the transmitters and transmit the multiplexed optical signals to the plurality of the CIRs via the optical fibers.

8. The light transmission apparatus of claim 7, wherein the first WGR has an NxN arrangement, and the plurality of third WGRs has an N×1 arrangement, and the quantity of each of the second WGRs, the plurality of the third WGRs, and the plurality of the CTRs is N.

9. The light transmission apparatus of claim 7, wherein the first WGR outputs N optical signals having a first wavelength through an N th wavelength from the first wavelength in a first optical fiber, outputs N optical signals having the first wavelength though the $N^{th}$ wavelength from a second wavelength in the second optical fiber, outputs N optical signals having the first wavelength through the $N^{th}$ wavelength from a third wavelength through the $N^{th}$ wavelength in the third optical fiber through an $N^{th}$ optical fiber.

10. The light transmission apparatus of claim 6, further comprising: a plurality of optical amplifiers corresponding to the CIRs, interposed between the first WGR and the CIRs, amplifying the optical signals output from the first WGR, and outputting the amplified optical signals to the plurality of the CIRs.

11. A light transmission method for transferring an upstream signal of a passive optical network (PON), the light transmission method comprising:
    inputting incoherent light output from the ILS, and outputting first optical signals in a plurality of CIRs;
    inputting the first optical signals in the first WGR, outputting the input optical signals to optical fibers corresponding to each of the CIRs, and outputting second optical signals input in the optical fibers to the corresponding plurality of the CIRs;
    demultiplexing the second optical signals output from each of the CIRs in the second WGR corresponding to each of the CIRs; and
    inputting the optical signals demultiplexed in the second WGR to a plurality of receivers connected to the second WGR.

12. The light transmission method of claim 11, further comprising:
    spectrum-splicing the incoherent light input from the first WGR via the optical fibers in the plurality of third WGRs corresponding to the optical fibers;
    transferring the optical signals having different wavelengths which are locked by the incoherent light that is spectrum-spliced and injected into the third WGRs in each of a plurality of transmitters including F-P LDs connected to nodes of the third WGRs via the optical fibers; and
    multiplexing the optical signals transmitted from each of the transmitters and transmitting the multiplexed optical signals to the first WGR via the optical fibers in each of the third WGRs.

13. The light transmission method of claim 12, wherein the first WGR has an NxN arrangement, and the third WGRs have an N×1 arrangement, and the quantity of each of the second WGRs, the plurality of the third WGRs, and the plurality of the CIRs is N.

14. The light transmission method of claim 12, wherein the first WGR outputs N optical signals having a first wavelength through an $N^{th}$ wavelength from the first wavelength in a first optical fiber, outputs N optical signals having the first wavelength through the $N^{th}$ wavelength from a second wavelength in the second optical fiber, and outputs N optical signals having a third wavelength through the $N^{th}$ wavelength from a third wavelength through the $N^{th}$ wavelength in the third optical fiber through an $N^{th}$ optical fiber.

15. The light transmission method of claim 11, further comprising: amplifying the optical signals transferred from the first WGR to the optical fibers.

* * * * *